(No Model.)

F. T. SUTLEY.
MERCURY PRESSURE GAGE.

No. 387,663. Patented Aug. 14, 1888.

Witnesses,
Louis J. Hirt,
W. J. Bainbridge.

Inventor,
Frank T. Sutley,
By Watson + Thurston
his attorneys

UNITED STATES PATENT OFFICE.

FRANK TUTTLE SUTLEY, OF FRANKLIN, PENNSYLVANIA.

MERCURY PRESSURE-GAGE.

SPECIFICATION forming part of Letters Patent No. 387,663, dated August 14, 1888.

Application filed May 1, 1888. Serial No. 272,461. (No model.)

*To all whom it may concern:*

Be it known that I, FRANK TUTTLE SUTLEY, a citizen of the United States, residing at Franklin, in the county of Venango and State of Pennsylvania, have invented certain new and useful Improvements in Plumbers' Mercury-Gages, of which the following is a full, clear, and exact description, reference being had to the accompanying drawings, in which—

Figure 1:
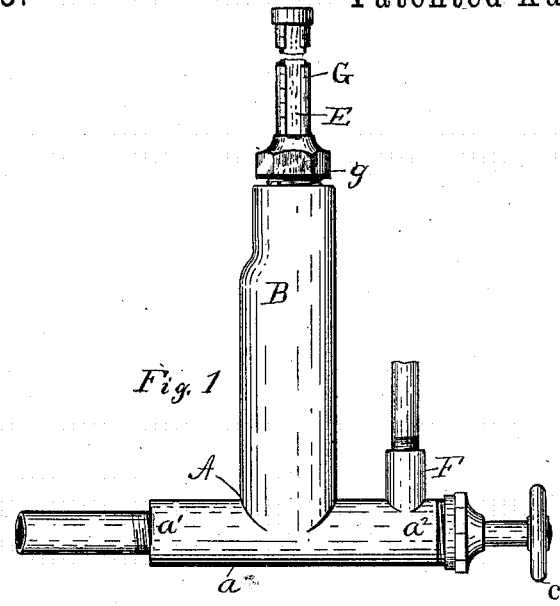
Figure 2:
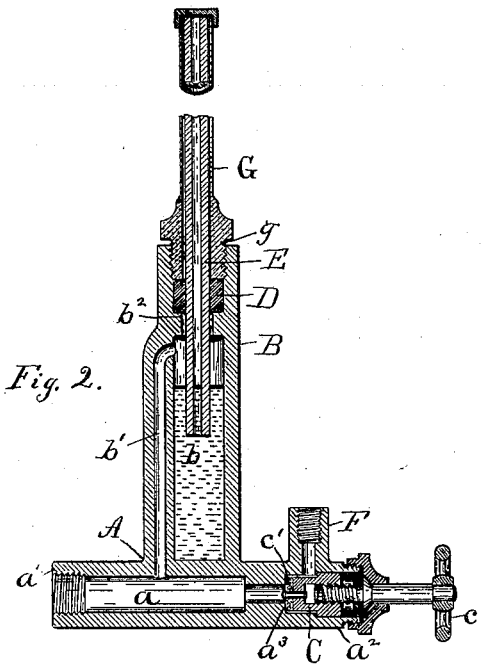

Figure 1 is a view in elevation of said invention, and Fig. 2 is a central vertical sectional view thereof.

The object of my invention is to furnish an apparatus for determining whether or not any system of pipes to which it is attached is tight and perfect for the purpose intended.

To this end it consists in the construction and combination of parts, hereinafter described, and pointed out definitely in the claims.

Referring to the parts by letter, A represents the body of the apparatus, which is cast in a single piece. It is provided with a pipe, $a$, which is screw-threaded at the end $a'$, whereby it may be attached to the system of pipes to be tested, and an arm, B, substantially at right angles to said pipe. The arm B is provided with a chamber or cistern, $b$, which is connected with the pipe $a$ by means of a duct, $b'$, which leads from near the upper end of said cistern to said pipe, as shown. At the end $a^2$ of the pipe $a$ is a valve, C, which is operated by a hand-wheel, $c$, or in any suitable manner. Within the pipe is a suitable valve-seat, $a^3$, against which the valve closes. In the form shown the valve-seat consists of an internally-projecting annular shoulder, $a^3$, and the inner end of the valve bears a disk, $c'$, of leather, which may be pressed closely against said shoulder.

Between the valve-seat and the end $a^2$ of the pipe $a$ a hollow stud, F, projects from the pipe $a$, and this stud is screw-threaded or otherwise adapted to be attached to a pipe from an air-pump. It also serves as the means through which ether or other pungent and easily-volatilized liquid may be introduced into the pipe $a$, and by the air-pressure carried through the entire system of pipes. If the pipes are found to leak, the odor escaping will enable one to easily locate the leaky joint.

Above the cistern $b$ the arm B is open and provided with an internally-projecting annular shoulder, $b^2$, within the central orifice of which a glass indicator-tube fits as closely as practicable.

D represents a thick elastic rubber washer which fits closely around said glass tube and within the arm B and rests upon the shoulder $b^2$. E represents a glass tube open at both ends and inclosed within a slotted tube, G. The lower end of this tube G is in the form of a nut, $g$, which screws into the arm B and down upon the rubber washer D, thereby compressing said washer, which is thereby pressed against said glass tube, thereby making an air-tight joint between them. The chamber $b$ is nearly filled with mercury and the tube E extends into the mercury.

This apparatus being attached to the system of pipes and an air-pump attached thereto and the valve C opened to permit the passage of air from the pump, the pipes are filled with air at a pressure substantially equal to the pressure they are designed to bear. This will cause the mercury to rise in the tube E, when the valve will be closed tightly. If after a suitable interval the pressure within the pipes, as indicated by the fall of the mercury in the tube, is not reduced, the pipes are assumed to be properly and tightly joined and fitted for use. In pipes for conveying natural gas the pipes are usually tested at fourteen pounds' pressure, in which case a tube, E, about twenty-eight inches long will be used, the length of the tube depending of course upon the pressure employed. The glass tube E, or the metal tube G, in which it is held, may, if desired, be graduated to show the pressure employed, although this is not necessary because the design of the apparatus is not to determine the exact pressure but to determine whether the pressure, whatever it may be, will remain substantially the same in the pipes.

I claim—

1. In a plumber's mercury-gage, the herein-described casting consisting of a pipe, $a$, having an internal valve-seat, and a projecting hollow stud, F, and an arm, B, containing a mercury-chamber and a duct leading therefrom to the pipe $a$, substantially as and for purpose specified.

2. The combination of the pipe $a$, chambered arm B, and a duct, $b'$, leading from the chamber thereof to said pipe, with a valve in one end of said pipe $a$, hollow stud connected with said pipe, and an indicator-tube secured tightly in the upper end of said chambered arm and extending into the chamber thereof, substantially as and for the purpose specified.

3. The combination of a pipe, $a$, and mechanism, substantially as described, for introducing and retaining air under pressure, with an arm, B, containing a mercury-chamber and a duct leading therefrom to the pipe $a$, an internal annular shoulder, $b^2$, in said arm B above the mercury-chamber, an indicator-tube, a rubber washer, and a nut for pressing said washer against said shoulder, substantially as and for the purpose specified.

FRANK TUTTLE SUTLEY.

Witnesses:
J. O. McCALMONT,
EDWARD E. HUGHES.